3,159,489
ANTEMORTEM INJECTION OF FLAVORING IN POULTRY
John F. Murphy, Chicago Heights, Ill., and Robert E. Murphy, Union, Mo., assignors to Swift & Company, Chicago, Ill., a corporation of Illinois
No Drawing. Filed Dec. 14, 1960, Ser. No. 75,684
8 Claims. (Cl. 99—107)

This invention, in general, relates to seasoned fowl products and to an improved method for seasoning the flesh of edible birds. More specifically, the invention relates to seasoning fowl whereby the seasoning is distributed uniformly throughout the flesh of the bird by the spreading action of the enzyme hyaluronidase. The expression "seasoning" is understood as meaning flavoring or preparing an appeal to taste as distinguished from curing or preserving. "Fowl" as used herein is understood to include poultry and all other varieties of edible birds.

Flavor in poultry is a quality highly desired by the consumer and as such is of great economic importance in the poultry industry. Consumer demand for the quality of tenderness in poultry and for pre-packaged, ready-to-cook or cooked, whole or disjointed poultry products has directly influenced the development of present day feeding and marketing procedures which have resulted in marketing birds at an early age. The early marketing of birds and other changes in the processing of birds have resulted in a milder flavor and in a gradual loss of the characteristic flavor well known to the poultry consuming public. In general, it may be said there is an increased consumer demand for supplementary seasoning agents which enhance the natural poultry flavor or which add a flavor complementary to it.

Heretofore, various methods of seasoning poultry have been proposed, of which the most acceptable is in the injection of liquid seasoning ingredients directly into the flesh or dressed birds. While injection of liquid solutions increases, the uniformity of penetration and reasonable control over quantities of substances injected, this method has not been commercially acceptable because injected solutions tend to avoid absorption and form pockets under the skin surface thereby detracting from the appearance of the fowl. The tendency of liquid solutions to resist absorption also produces an ununiform dispersion of the seasoning which adversely affects the palatability of the product. In addition, from 8 to about 10 or more separate injections, depending upon the size and weight of the fowl, are required to effect a reasonable dispersion of the seasoning ingredients. The amounts of liquid seasoning injected generally range from 5 to 7% of the weight of the dressed bird. The incorporation of substantial quantities of liquid seasoning in fresh poultry has long been considered adulteration by governmental agencies.

It is, therefore, an object of the present invention to overcome the disadvantages and limitations of the above disclosed methods for seasoning fowl.

It is also an object of the instant invention to provide a process for seasoning fowl whereby a uniform distribution of a seasoning composition throughout the flesh of the bird is effected.

It is another object of this invention to inoculate live fowl with flavor-improving compositions in such a manner to obtain complete and uniform distribution of said compositions, but without the fowl losing its eye appeal or consumer acceptability.

It is another object to provide a process for seasoning fowl which is adaptable to existing processing plant facilities merely by adding a single improved injection step.

It is still another object of this invention to provide a process for seasoning fowl whereby a single quantity of a seasoning concentrate and the enzyme hyaluronidase are injected into a portion of the bird's body which may later be removed during processing.

It is yet another object of the present invention to provide a method of seasoning fowl whereby live fowl is injected with flavor-enhancing substances so as to obtain improved flavor when cooked, but without affecting normal appearance or natural weight of the dressed carcass.

Other objects and advantages will be apparent to one skilled in the art from the following detailed description.

In general, the present invention relates to an antemortem injection of a seasoning composition and the enzyme hyaluronidase under the skin of fowl, and holding the bird for a period of time to allow the spreading action of the enzyme to effect uniform distribution of the seasoning concentrate throughout the flesh of the bird prior to slaughter.

More specifically, the invention relates to the preferable method of injection of a solution of a seasoning composition and the enzyme hyaluronidase under the neck skin of fowl shortly before dispatch or slaughter. The invention has application in the seasoning of all varieties of edible birds irrespective of age, size, or sex. An amount of time is allowed to elapse between injection and dispatching to permit the spreading action of the enzyme to effect entry of the seasoning ingredient into the birds vascular system via the network of vascular vessels located in the bird's neck. After entry of the seasoning composition into the bird's vascular system, it is spread uniformly throughout the flesh of the bird. Thereafter, the processing of the bird is accomplished by conventional procedures.

Some of the advantages of our improved process are: (1) the attainment of an essentially uniform distribution of seasoning agent throughout the flesh of the fowl within minutes of a single subcutaneous injection; (2) there is no adulteration of the final product with large volumes of fluid; (3) it utilizes a relatively small volume of solution 2–3 cc. per bird with resultant savings in processing costs and; (4) the combination of the enzyme hyaluronidase and flavoring agents permit the use of a single subcutaneous injection into the flesh of an area abundant in blood vessels such as in the neck rather than inter-vascular or inter-muscular injections in other parts of the carcass thereby avoiding damage to and loss of value of the final product. Preferably, the injection is made in that portion of the bird's neck skin just under the head which is later removed during processing.

The following examples are illustrative of this invention but should not be construed as imposing any limitations on the invention other than defined in the appended claims.

*Example I*

A number of live eight week old chickens were injected with 2 cc. of Veri Essence Dill Concentrate plus 1 cc. Saline solution of hyaluronidase 150 t.r.u./cc. (turbidity reducing units). The injection was made by means of a needle and hypodermic syringe under the neck skin just below the head so that any unabsorbed solution was removed with the head. After injection, the birds were held for the indicated time interval, dispatched and processed in the customary manner, iced and stored under refrigeration for six days, and cooked in a 350° F. oven.

| | Time Lapse Between Injection and Dispatch | Flavor After 350° F. Oven Cook |
|---|---|---|
| Bird #1 | 30 minutes | Definite dill flavor in all parts of chicken. |
| Bird #2 | 1 hour | Do. |
| Bird #3 | 2 hours | Do. |

Hyaluronidase assay by the turbidity method is based upon the fact that hyaluronic acid (HA) forms a turbid suspension when treated with certain acidified protein solutions. When this turbidity is plotted against HA concentration of from 0.02 to 0.2 mg. a straight line is obtained.

One t.r.u. is that activity which decreases the turbidity producing capacity of 0.2 mg. HA to that of 0.1 mg. in 30 minutes.

*Enzyme.*—dissolved in 0.1 M phosphate buffer (3–6 t.r.u./ml.).

*Substrate.*—Worthington hyaluronic acid dissolved (allow to stand overnite or warm gently) in phosphate buffer to give a concentration of 0.4 mg./ml. (If necessary readjust pH to 5.3.) Keep refrigerated, solution was stable several weeks.

*Phosphate buffer.*—13.80 gms. $NaH_2PO_4H_2O$ and 8.76 gms. NaCl in $H_2O$ pH 5.3 with 5 N NaOH dilute 1 liter.

*Acetate buffer.*—Acetic acid diluted to 0.5 M, 5 N NaOH having been added to pH 4.20.

*Albumin reagent.*—2.50 gms. Albumin Powder Fraction V (Armour & Co.) in 250 ml. of acetate buffer. 4.0 N HOl added to pH 3.0. Solution in large Pyrex tubes is heated in boiling water bath for 30 minutes after reaching 93° C., cooled to room temperature and diluted to 1 liter with acetate buffer. Filtered and stored in refrigerator.

*Procedure.*—Prepare substrate curve using stock HA solution. Into colorimeter tubes place 0.1 ml. to 0.6 ml. (0.04 mg. to 0.24 mg.) bringing volume in each tube to 1.0 ml. with buffer. Place in boiling water bath 5 minutes, cool, add 9.0 ml. of albumin reagent. Read in colorimeter (540 mu) after 10 minutes and plot readings against HA concentration.

*Digestion.*—Place colorimeter tubes containing 0.5 ml. of HA (0.2 mg.) in $H_2O$ bath at 37° C. At zero time add 0.5 ml. of dil. enzyme. Digest 10 minutes, transfer to boiling water bath for 5 minutes, cool in cold water, add 9.0 ml. of albumin reagent and after 10 min. read in colorimeter at 540 mu.

Two control tubes should be run, one with 0.5 ml. of HA (0.2 mg.) and the other with 0.25 ml. HA (0.1 mg.); both are brought to 1.0 vol. with phosphate buffer and treated in the same manner as the digestion tubes.

*Example II*

A second group of live eight week old chickens were tested to demonstrate the spreading effect of the enzyme hyaluronidase in disseminating the seasoning concentrate throughout the various parts of the bird. After injection the birds were held for thirty minutes dispatched and processed in the customary manner, iced and stored under refrigeration for six days, and cooked in a 350° F. oven.

| Materials Injected | Flavor after 350° F. oven cook |
|---|---|
| 1½ cc. Liquid Smoke + 0.05 cc. hyaluronidase | Smoke flavor. |
| 1½ cc. Liquid Smoke | No Smoke flavor. |
| 1½ cc. Sage Oil + 0.05 cc. hyaluronidase | Sage flavor. |
| 1½ cc. Sage Oil | No Sage flavor. |
| 1½ cc. Dill Flavor + 0.05 cc. hyaluronidase | Dill flavor. |
| 1½ cc. Dill Flavor | No Dill flavor. |

*Example III*

A third group of live eight week old chickens were tested to demonstrate the spreading effect of hyaluronidase and to demonstrate that a live broiler can be injected five minutes before dispatch with a definite enhancement of flavor. After the injection the birds were held for the indicated time interval, dispatched and processed in the customary manner, chilled in ice slush for 16 hours, iced and stored under refrigeration at 40° F. for 24 hours, and cooked in a 350° F. oven.

| Time Lapse Between injection and Dispatch | Material Injected | Flavor after 350° F. Oven Cook |
|---|---|---|
| 30 minutes | 1½ Sage Oil and 0.05 cc. hyaluronidase. | Definite Sage flavor. |
| 15 minutes | do | Do. |
| 5 minutes | do | Do. |
| Do | 1½ Garlic Oil and 0.05 cc. hyaluronidase. | Definite Garlic Flavor. |
| Do | 1½ Sesame Oil and 0.05 cc. hyaluronidase. | Definite Sesame Flavor. |
| Do | 1½ Celery Oil and 0.05 cc. hyaluronidase. | Definite Celery Flavor. |

It is believed that the function of the enzyme hyaluronidase in facilitating the absorption of the seansoning ingredient into the vascular system of live fowl is accomplished by hydrolizing and decreasing the viscosity of the so-called ground substance between the tissue cells thereby permitting the seasoning ingredient to diffuse more rapidly over a larger area. The amount of seasoning ingredient and amount of the enzyme hyaluronidase will vary according to the physical characteristics of the fowl inoculated, e.g. variety, weight, age, etc., the physical and chemical characteristics of the particular seasoning ingredient and the time interval between injection and dispatch. An excess amount of flavoring material is usually injected. The amount distributed throughout the bird may be controlled by limiting the time for its absorption and distribution. The time is predetermined and in practice varies but is at least about 1½ minutes. The most practical time interval between injection and dispatch for young chickens is generally 5 minutes or less, and preferably about 2–5 minutes. Adequate enhancement of flavor for intervals of more than 2 hours after injection has been obtained in some tests. The interval between injection and dispatch may be prolonged by increasing the dose of the active composition, i.e., the flavoring agent mixed together with other ingredients, thus prolonging the period of diffusing, absorption into the vascular system and the final elimination from the body. One cc. of hyaluronidase solution containing 150–200 t.r.u./cc. (turbidity reducing units) was found to produce adequate results for the larger variety of fowl whereas minimum amounts of about 0.05 cc. of 5 t.r.u./cc. were required for young tender fowl.

Seasoning compositions applicable for this process include a wide variety and are exemplified by such spice oils as: allspice, anise, bay, caraway, cardamon, cassia, celery seed, cinnamon, clove, coriander, cumin, dill, fennel, garlic, ginger, mace, nutmeg, rosemary, sage, tarragon, thyme, marjoram, oregano, sesame; such oleoresins as: capsicum, black pepper, ginger, sage, and paprika; as well as liquid smoke preparations.

Obviously, many modifications and variations of the invention as herein before set forth may be made without departing from the spirit and scope thereof, and therefore only such limitations should be imposed as are indicated in the appended claims.

We claim:

1. A method for enhancing the flavor of meat derived from live fowl comprising: subcutaneously depositing in live fowl the enzyme hyaluronidase and a seasoning agent; holding said fowl for a time sufficient to permit said enzyme to disperse said seasoning agent into the vascular system of said fowl to insure a substantially uniform distribution throughout the body thereof; and dispatching prior to the elimination of said seasoning agent from the body of said fowl.

2. A method of seasoning the flesh of edible birds comprising: introducing under the skin of live birds a seasoning agent and a small amount of the enzyme hyaluronidase, said enzyme acting to disperse said seasoning agent into the vascular system of said birds; and dispatching said birds within two hours after introducing said seasoning agent.

3. A method for imparting flavor to the flesh of edible birds comprising: introducing under the skin of a live bird a seasoning agent and a complement of the enzyme hyaluronidase which disperses said seasoning agent into the vascular system of said birds; and dispatching said bird after about 1.5 minutes following the introduction of said seasoning agent.

4. A method of treating live fowl to enhance the flavor derived from said fowl comprising: inoculating live fowl with a single subcutaneous liquid injection, said injection comprising a suitable seasoning composition and the enzyme hyaluronidase, said enzyme acting to disperse said seasoning composition into the vascular system and uniformly throughout the flesh of said fowl; dispatching said fowl; and thereafter processing the fowl in the customary manner.

5. The method of claim 4 wherein the fowl is cooked prior to packing for shipment.

6. A method of seasoning the flesh of edible fowl comprising: injecting into a live fowl a single quantity of about 2–3 cc. liquid solution comprising a major amount of a seasoning agent and a minor amount of the enzyme hyaluronidase, said injection being made in a portion of the fowl's body having an abundance of blood vessels; and dispatching said fowl after a time sufficient to permit said enzyme to disperse said seasoning agent into the blood stream and throughout the flesh of said fowl.

7. A method of seasoning the flesh of edible birds, which comprises the steps: first, introducing a subcutaneous injection consisting of a liquid mixture of a suitable seasoning agent and the enzyme hyaluronidase in the neck skin of said birds subsequently removed in process; and second, dispatching said birds within from about 1.5 minutes to about 120 minutes after said injection.

8. A method of seasoning the flesh of edible birds comprising: inoculating live birds with a single subcutaneous injection in the neck skin which is subsequently removed in the processing, said injection consisting essentially of a liquid mixture, a seasoning composition and from about 0.05 to about 1.0 cc. of a solution of the enzyme hyaluronidase containing from about 3 to about 200 t.r.u./cc.; dispatching said birds within from about 1.5 minutes to about 120 minutes after the injection to allow said enzyme to disperse said seasoning composition into the vascular system and subsequently uniformly throughout the flesh of said birds; and thereafter processing said birds in the customary manner.

References Cited in the file of this patent

UNITED STATES PATENTS

| 2,128,952 | Mareta | Sept. 6, 1938 |
| 2,687,961 | Ellis | Aug. 31, 1954 |
| 2,709,658 | Buchanan | May 31, 1955 |
| 2,903,362 | Beuk et al. | Sept. 8, 1959 |

OTHER REFERENCES

"The Condensed Chemical Dictionary," fifth edition, 1956, by A. and E. Rose, published by Reinhold Publishing Corporation, New York, page 566, article entitled Hyaluronidase.